United States Patent [19]

Waldo

[11] Patent Number: 4,945,428

[45] Date of Patent: Jul. 31, 1990

[54] METHOD OF MANAGING A MEDIA LIBRARY

[75] Inventor: Ellen J. Waldo, Tucson, Ariz.

[73] Assignee: International Business Machines Corporation, Armonk, N.Y.

[21] Appl. No.: 190,738

[22] Filed: May 5, 1988

[51] Int. Cl.$^5$ ............................................. G11B 15/68
[52] U.S. Cl. ...................................... 360/92; 360/71; 369/36
[58] Field of Search ...................... 360/69, 71, 91, 92, 360/137; 369/34, 36, 37, 38, 39

[56] References Cited

U.S. PATENT DOCUMENTS

| | | | |
|---|---|---|---|
| 4,120,629 | 10/1978 | Christian et al. | 425/135 |
| 4,608,679 | 8/1986 | Rudy et al. | 369/36 |
| 4,644,425 | 2/1987 | Tamaki | 360/92 |
| 4,654,727 | 3/1987 | Blum et al. | 360/92 |
| 4,685,095 | 8/1987 | Rudy et al. | 369/36 |
| 4,802,035 | 1/1989 | Ohtsuka | 360/92 |
| 4,814,592 | 3/1989 | Bradt et al. | 369/34 |
| 4,815,055 | 3/1989 | Fago, Jr. | 369/36 |

Primary Examiner—David J. Severin
Attorney, Agent, or Firm—Manny W. Schecter

[57] ABSTRACT

A data storage hierarchy includes a media library characterized by a travelling elevator which moves in front of an open-faced wall of storage cells or compartments and ingress-egress slots to a plurality of data recording devices. Optical disks are selectively moved by the travelling elevator between the storage cells and the data recording devices. The carrier can carry a plurality of the optical disks at a given time. Each time the travelling elevator accesses a storage cell or a recording device, the record disk currently held by such cell or device is moved onto the travelling elevator and then the optical disk carried to such cell or device is inserted into the cell or device. Programs are provided for controlling the movements of the travelling elevator for maximizing swap operations of the disk at cells and devices. The optical disks have no home cell in the library. The retentive data structures are continually updated contemporaneously with the movement of the optical media including identificaiton of the optical media being carried on the travelling elevator. Movement of the optical media from any of the devices to the storage cells is based upon movement to a closer one of the cells irrespective of the previous content of the cell.

2 Claims, 1 Drawing Sheet

METHOD OF MANAGING A MEDIA LIBRARY

FIELD OF THE INVENTION

The present invention relates to media library systems, particularly in a method of minimizing transport times for series of transporting record media between storage cells and data recording devices.

BACKGROUND OF THE INVENTION

Rather than manually mount and demount removable media from a data recording device, it has been the practice in certain situations to provide an automatic media library. Such media library can be viewed as a specialized form of automatic warehousing, where the warehoused item is record media and where in the input/output are streams of data objects, as well as record media being inserted and removed from the library. The earliest form of record media libraries used magnetic recording tape and microfiche cards. Either the tape or the card libraries employed open-faced walls having a plurality of storage compartments, cells or slots for passively storing the magnetic tape/cards. Integrally associated with the library are one or more recording or reading devices. In the case of magnetic tape drives, the drives are either at the end of the wall or disposed and mounted inside the open-face array of storage cells. In both types of libraries, a travelling elevator automatically moved the record media between the passive storage cells and the data recording/reading devices. In the case of magnetic tape, a single unit of tape, either a cartridge or spool is transported by the travelling elevator during each motion. In a similar manner, a cartridge or package of microfiche cards could be transported between the passive cells and the microfiche reader/recorder as a single unit. In both types of early libraries, the motions of the travelling elevator were sequenced for minimizing the travel length and travel time for an increase in efficiency of the library system. In both types of libraries, the record media were assigned a home passive position. Upon command, the travelling elevator would fetch a record medium from its permanently assigned storage cell and transport it to a recorder. Upon completion of the data processing operation of recording or reading, the travelling elevator is then commanded to return the record medium back to its original storage cell. Provisions were made for inserting and removing various record media. The insertion or removal would take the removed media out of any catalog or directory that defined the location of the record media in the library while the insertion of a record medium would require adding the identification of its informational content to a directory.

J. Christian in U.S. Pat. No. 4,120,629 (J. Christian) shows an automatic warehousing system for magnetic media involved in the manufacturing process. The magnetic media units were assigned to differing storage cells in accordance with the state of manufacturing. However, in each state of manufacturing the magnetic media was always kept in the same or temporarily assigned storage cell. Accordingly, it is seen that it has been the practice to assign a record medium to a given storage cell for the duration of its activity with respect to an automatic warehouse type of library.

Cary, et al. in U.S. Pat. No. 4,608,679 (369-036) shows a travelling elevator capable of carrying two record media at a time. Either one of the two media may be stored in a cell or inserted into a drive or removed therefrom independently of the other record medium. Cary, et al. do not teach how to efficiently use this travelling elevator, hereinafter referred to as "a medium carrier".

SUMMARY OF THE INVENTION

It is an object of the present invention to provide methods and apparatus for minimizing travelling elevator or carrier movement in an automatic warehouse type of media library and to provide methods and apparatus for eliminating a requirement of a fixed storage cell for the diverse media used in the media library.

In accordance with the present invention, the media carrier is moved to one of the storage cells or slots for removing the medium stored therein for being carried to a recorder or drive. The carrier moves to the drive and removes the medium from the drive and places it in the carrier and while at the drive inserts the first removed medium into the drive, thence the carrier moves to a storage cell whereupon it may fetch a stored medium from the cell and insert it onto the carrier and then store the second-mentioned record medium into that cell. It is preferred that each time the carrier stops at a cell or drive a record medium be removed therefrom and a second record medium be inserted there into.

Contemporaneously with the movement of record media, a library control block indicating the instantaneous location of the various record media within the library is updated and contemporaneously with that updating a retentive copy of the location indication is constructed. The location indication includes location on the carrier in the storage cell or in an input/output station of the library. In the preferred form, a volume serial number (VOLSER) is uniquely assigned to each of the record media. All media tracking is based upon the VOLSER of that record media, respectively.

The foregoing and other objects, features, and advantages of the invention will be apparent from the following more particular description of preferred embodiments of the invention, as illustrated in the accompanying drawing.

DETAILED DESCRIPTION

Figure 1:
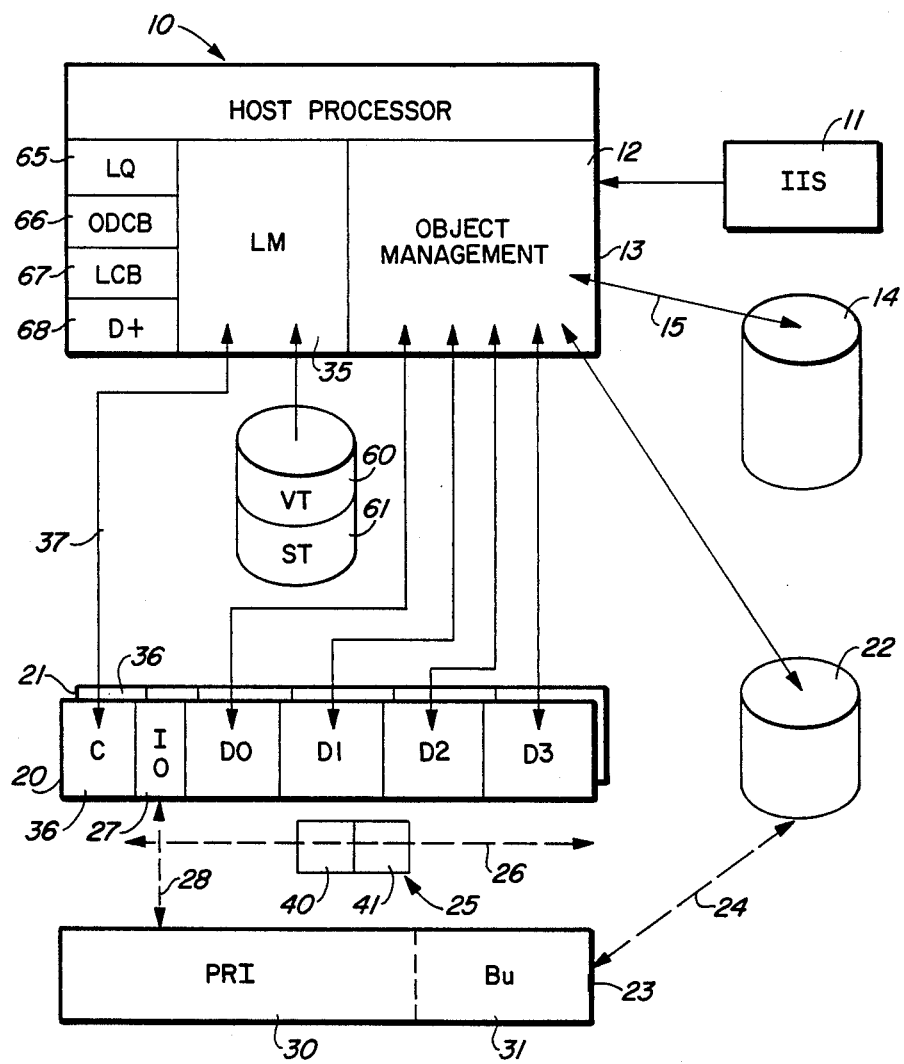
FIG. 1 diagrammatically illustrates a data storage hierarchy in which the present invention is advantageously employed.

Host processor 10 is programmed to process a plurality of named data objects. An image information source IIS 11 sequentially supplies image-indicating data objects to host processor 10 for processing. An object management set of programs 12 which are resident in the main memory portion 13 of the host processor 10 temporarily stores the received data objects and provides for data transfer of the data objects to diverse destinations. A first destination for work in process data objects is a direct access storage device (DASD) 14 as indicated by double-headed arrow 15. Additionally, object management 12 supplies a copy of each of the received data objects to one or more media libraries 20, 21. Each of the media libraries are constructed as shown in simplified form for library 20. Library 20 includes four optical disk recorders capable of ablatively recording on optical media for drive D0–D3 are individually operatively connected to host processor 10 for receiving and supplying data objects from and to the object management 12. Additionally, object management 12 may supply a backup copy of predetermined ones of the data object to a freestanding optical recorder 22. When the removable record medium in recorder 22 is filled to its capacity, then that record medium is removed manually from recorder 22 and placed in shelf storage 23 as indicated by dashed line arrow 24.

The libraries 20, 21 provide for automatic movement of the various optical media stored in storage cells in the libraries 20, 21 and moved between the drives D0–D3 and the respective cells by a travelling elevator or carrier 25 which has a travel path co-extensive with the open-faced walls and the drives of the library 20 as indicated by dashed line double-headed arrow 26. Each of the libraries 20 and 21 have their respective travelling elevators or media carriers. Additionally, each library has an input/output media station I/O 27. Media placed in the I/O station 27 can be manually transferred to the shelf storage 23 as indicated by double-headed dashed line arrow 28. The manual transfer is indicated by arrows 24 and 28 resulting from a message given to personnel maintaining the shelf storage 23. The record media move from I/O station 27 to shelf storage 23 displacing the primary copy portion PRI 30 while the backup copies from recorder 22 are placed in backup portion BU 31.

Also included within host processor 10 is the library manager LM 35. LM 35 is operatively coupled to the control portions 36 respectively of libraries 20 and 21 as indicated by double-headed arrow 37. LM 35 receives status information from the controls 36 and supplies commands thereto for effecting media transport by carrier 25. This arrangement is generally known in the art as described supra.

LM 35 is constructed such that carrier 25 which is capable of carrying two record media in its two media receiving portions 40 and 41 to minimize the travel distance in time of carrier 25. LM 35 is also constructed such that each record medium is at a floating home location which is conducive to maximizing the thruput of the libraries 20, 21 as will become apparent. The sequence of operation at optimum efficiency is shown in simplified form in FIG. 2. Three carrier 25 operations are illustrated respectively indicated by numerals 44, 45, 46. Steps 44 and 46 occur at a storage cell of a library while step 45 occurs at one of the drives D0–D3. Numeral 47 indicates that the three illustrated steps are part of a sequence of steps performed by travelling elevator 25. In step 44, elevator 25 first fetches a record medium stored in the storage cell adjacent the carrier 25 as indicated by fetch 50. Step fetch 50 empties the storage cell. If carrier 25 is carrying a record medium for storage, it then inserts the record medium into the storage cell indicated by the swap step 51. That is, at the address cell at which carrier 25 is positioned the cells previously stored record medium is swapped for a record medium currently being carried by carrier 25.

Carrier 25 carries the just-fetched record medium to one of the drives D0–D3 for mounting same for data accessing operations. If the drive is currently not holding any record medium, then carrier 25 at step 52 mounts the carried record medium into the address drive. Otherwise, at step 53 a second swap occurs. Second swap consists of first removing the record medium held in the address drive and inserting it into section 40 of carrier 25 and then inserting into the address drive the record medium carried in section 41. The carrier 25 just received record medium in section 40 is being demounted from the address drive and must be carried to the storage cell. In the prior art such storage cell would be the storage cell permanently assigned to such record medium. In accordance with the present invention, the record medium removed from a data recording device D0–D3 is stored in the closest available empty storage cell or in a storage cell which contains or holds another record medium to be mounted on another one of the library drives. Accordingly, at step 46, carrier 25 moves to either a closest one of the empty storage cell and stores the record medium therein as indicated by numeral 54 or moves to a storage cell having an addressed record medium. In the latter instance, the fetch step 55 is performed for moving the second address cell record medium into carrier 25 empty portion 41 and then in swap step 56, the record medium in portion 40 is inserted into the addressed cell. From the above, it can be seen if a swap operation can be effected at each stop of carrier 25 maximal efficient use of carrier 25 is effected. While this is not always possible, it is highly desired. In another version of the movement control of carrier 25, any demounted line from a drive D0–D3 which was received by the carrier during a swap operation can be carried until another mount is commanded whereupon the carried record medium is stored in the storage cell having the record medium to be next mounted. Included in the mount and swap operations are I/O station.

In one form of the library, such as shown by Cary et al., supra, the lowest numbered storage cells are disposed along a bottom portion of the open-faced library wall just underneath the drive D0–D3. The carrier 25 motion for moving record media between the drives and the lowest numbered carriage cell are shorter ones of the movements; that is, the higher numbered cells require a greater movement by carrier 25 than the lowered numbered cells. Therefore, in moving a demounted volume from a drive to an empty or other storage cell, the lowest numbered cells are scanned first as later described for giving preferenced treatment to storing a demounted record medium into the lowered numbered cells.

LM 35 manages the libraries 20, 21 using various data structures as next described. LM 35 uses retentively stored volume table VT 60 and slot table ST 61. In a constructed embodiment, each record medium has a separate volume of data on its opposite recording sides. Accordingly, two volumes of data are stored on a single record medium. Each of the volumes is assigned a name called a volume serial number (VOLSER). VT 60 retentively stores control information about each volume which is accessible by either VOLSER or location within the data hierarchy. The entry format for VT 60 is shown below:

VOLUME TABLE VT 60 ENTRY

VOLSER A
VOLSER B
LOCATION
SHELF ADDRESS
LIBRARY NAME
LIBRARY ADDRESS
EJECT DATE
(OTHER FIELDS)

In VT 60 above, VOLSER A is a field containing the VOLSER on the A side of the disk, while VOLSER B is a field storing the VOLSER on side B of the disk. The LOCATION FIELD is a single bit to indicate whether the record medium is stored in a library 20, 21 or in shelf storage 23. The SHELF ADDRESS field indicates the location within shelf storage 23, the medium is located. When the LOCATION bit indicates the medium is in a library, the SHELF ADDRESS field is not used. If the LIBRARY NAME and the LIBRARY ADDRESS respectively indicate whether library 20, 21 is currently storing the record medium and the LIBRARY ADDRESS indicates which storage cell is storing the record medium, whether the carrier 25 is holding the recording medium in either of its parts 40, 41, whether or not the record medium is in I/O station 27 or which of the drives D0–D3 is holding the record medium. Accordingly, the information in VT 60 indicates at all times the precise location of each record media in the data storage hierarchy. EJECT DATE field indicates when the record medium should be ejected from a library 20, 21 through I/O station 27 to shelf storage 23. OTHER FIELDS are retentively stored as well which contain information beyond description for the present invention.

ST 61 retentively stores information concerning the storage cells or slots of both libraries 20, 21. The table below indicates an entry of ST 61.

SLOT TABLE ST 61 ENTRY

LIBRARY NAME
SLOT NUMBER
OCCUPIED
OPERATIONAL
VOLSER A
VOLSER B
(OTHER FIELDS)

In the above entry, the LIBRARY NAME and SLOT NUMBER are fixed data identifying each of the slots and all of the libraries attached to host processor 10. OCCUPIED field is a single bit field indicating whether the slot is occupied. OPERATIONAL field is a single bit field indicating whether or not record media can be stored in the slot. The fields VOLSER A and VOLSER B respectively store the VOLSER indicating the volume on sides A and B of the record medium. OTHER FIELDS indicate other information beyond the description of the present invention. LM 35 also includes additional data structures within the main memory of host processor 10 for more efficiently managing the movement of carrier 25 and the movement of media within the libraries 20, 21. A FIFO (first in, first out) queue of library media moves LQ 65 stores moves requested by object management 12. Such move request is a request for making a VOLSER volume available for object management 12 usage in one of drives D0–D3. LM 35 constructs a queued moved request in LQ 65 from the VOLSER location and destination, as will become apparent.

LM 35 inserts into LQ 65 in a first field the source of the record medium, in a second field the destination of the record medium, and in the third field whether the move will result in a swap operation at the destination. Other control information may be stored in each entry as well. LM 35 may adjust the sequence of moves indicated by LQ 65 as will become apparent.

LM 35 uses three other data structures stored in main memory of host processor 10 and which contain identical information to that stored in VT 60 and ST 61. The first is optical disk control block ODCB 66 of which each entry format is shown in the table below:

OPTICAL DISK CONTROL BLOCK ODCB 66 ENTRY

VOLSER A
VOLSER B
LIBRARY NAME
LIBRARY LOCATION
(OTHER FIELDS)

In the above table for ODCB 66, VOLSER A and B indicate the two fields storing the VOLSERs of sides A and B of a record medium identified in ODCB 66. As long as the record medium is within a library 20 or 21, VOLSER A and VOLSER B is constant data. The current location of the record medium storing VOLSER A and B is indicated respectively in the LIBRARY NAME and the LIBRARY LOCATION. If the LIBRARY LOCATION includes D0–D3, I/O station 27, all of the storage cells and the two portions 40, 41 of carrier 25. Other fields not pertinent to an understanding of the present invention may be added to ODCB 66. Each time host processor 10 is powered up, LM 35 fills ODCB 66 based upon information stored in ST 61.

The second data structure used by LM 35 is library control block LCB 67. LCB 67 is a single-entry control block as shown in the below table.

LIBRARY CONTROL BLOCK LCB 67

(FIXED DATA)
CARRIER PART 40
CARRIER PART 41
I/O STATION 27
CELL 001
CELL 002
(OTHER CELLS)

The first portion of LCB 67 includes fixed data describing configuration information about the respective libraries, i.e., some of the libraries may have only two drives D0 and D1, rather than the four drive D0–D3, may have a plurality of input/output stations 27, etc.

The first two fields storing variable data relate to carrier 25 parts 40 and 41. These two fields indicate the number of record media currently being held by carrier 25 as well as the identification of such record media. The next field is the I/O station 27 which indicates the VOLSER of a number of the record medium being ejected from the library for transfer to storage shelf 23. In the event a record medium is being inserted into a library 20, 21 the VOLSER of the two volumes on the record medium is known and inserted into field I/O station 27 of LCB 67. Then a plurality of fields, one field for each of the storage cells beginning with number 001 through the highest number is found. The lowest numbered cells are placed first since LCB 67 is scanned for a destination of a demounted volume through the closest empty cell. Each of the fields in LCB 67, when the identified location of the library contains a record medium, will contain at least VOLSER A and preferably both VOLSER A and B for the identified record medium. Note that LCB 67 does not have fields for devices D0–D3. This information is contained in ODCB 66 and optionally may be repeated in LCB 67.

The third data structure in main memory is drive table DT 68 shown below:

| DRIVE TABLE DT 68 | | | | | | | |
|---|---|---|---|---|---|---|---|
| D0 | D1 | D2 | D3 | D0' | D1' | D2' | D3' |

DT 68 is shown as an eight-bit table. The leftmost four bits D0–D3 are one bit fields identifying the drive D0–D3 of library 20 while the rightmost four bits D0'–D3' identify the four drives in library 21. When any of the bits is set to unity, the identified drive contains the record medium. Whenever the bit is zero, the drive is empty and available for record medium mounting. Upon demounting a record medium from any of the drives, the drive table 68 is updated by resetting the bit to zero indicating no record medium is mounted for data processing operations in the identified drive. The record medium may still be held by the drive pending movement from the drive to a storage cell to be assigned. Accordingly, even though the drives D0–D3' may all indicate they are available for receiving a record medium to be mounted, ODCB has to be examined to determine whether a swap is required for mounting a requested record medium into the drive. Accordingly, DT 68 indicates a logical status of a record medium within the drive as being mounted or logically demounted.

The various sequence of operations for implementing the invention are next described. All of the first described operations on LM 35 are initiated by the command generated by object management 12. Generation of the command is beyond the present description and transfer of the command from object management 12 to LM 35 would then be through a usual message area, program interrupt and the like. When object management 12 is finished with a mounted record medium in any one of the drives of a library, it issues a demount message to LM 35 indicating the drive address and the VOLSER of the mounted volume. Note that this VOLSER can be either A or B since object management 12 may be dealing with only one of the two volumes on the record medium. LM 35 responds to the received demount message by accessing DT 68 and resetting the bit corresponding to the address drive to zero. This completes the logical demount of the VOLSER. When a plurality of users are accessing a single record volume in any one of the drives, it is up to object management 12 to open and keep track of the number of open files on the respective record medium. Optionally, LM 35 may indicate the address drive and VOLSER in a source field portion of LQ 65 with the destination field remaining empty.

Figure 2:
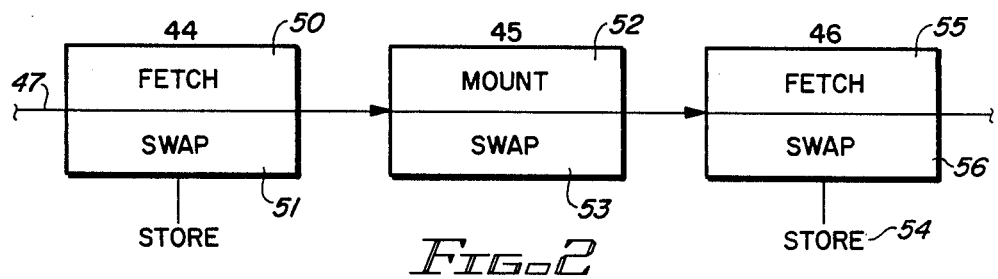
FIG. 2 is a simplified flowchart showing a sequence of operations for a travelling elevator or carrier used in the FIG. 1-illustrated system.

When object management 12 causes a mount message to be issued to LM 35, the mount message will include a VOLSER of a volume stored in a record medium in one of the many storage cells or slots. LM 35 inserts the source cell address into the source field of LQ 65 and selects a drive based upon the content of DT 68 as the destination address. LM 35 may prefer to access the drives currently holding the record medium. In that instance, LM 35 updates LQ 65 to initiate a swap at the address drive and adds a second entry into LQ 65 for the move from the address drive of the currently held record medium to an empty cell storing a record medium to be next mounted. In the latter situation, LM 35 scans LCB 67 to find the first-occurring, lowest-numbered empty cell. Once the lowest-numbered empty cell is identified, it is added as the destination address for the move of the record volume in the address drive to such empty cell. Then steps 44 and 45 of FIG. 2 are executed as previously described. An entire series of such moves are instituted by LM 35 based upon mount and demount messages with the mount messages triggering the physical activity of carrier 25 for completing a logical demount into a physical demount Object management 12 can also command LM 35 to eject a record volume by moving the record volume from a cell or a drive to I/O station 25. In a similar manner, object management 12 may command LM 35 to access I/O station 25 for moving a new record medium into either of the libraries 20, 21. Such record volume may be a so-called scratch volume (no data recorded thereon) still as a VOLSER or maybe a retrieved, previously-recorded record medium from shelf storage 23. Each move effected by LM 35 requires both the volatile data structure 65–68 to be updated as well as the retentive data structures VT 60 and ST 61. Such updating is contemporaneous with the moves. For example, volume table VT 60 is updated each time a record medium is moved within a library 20, 21 or between the libraries and shelf storage 23. Contemporaneous with the movement from shelf storage 23 into a library 20 the location bit is set to indicate which of the two media storing facilities is currently storing the record medium. Note that once the command is issued for moving a VOLSER from shelf storage 23 into I/O station 27, I/O station 27 senses the insertion of a record medium. Normal step is then to move that record medium to one of the four drives D0–D3 to verify that the VOLSER on the inserted record medium corresponds with the VOLSER requested. This requires mounting the record medium onto one of the drives such that object management 12 can read VOLSER for verifying it is the correct record medium that was inserted into the library. In the case of certain scratch volumes, such volumes may not have any VOLSERs assigned to them. In that case, the scratch volume will receive a VOLSER from object management 12 upon its first entry into any one of the four drives. Note that updating of the retentive copies requires updating even when transferring from I/O station or any of the other library locations into either part 40 or 41 of carrier 25. Since the carrier 25 movements can be measured in seconds, the retentive updating ensures a continuing and precise tracking of record media locations within the library and data storage hierarchy. In VT 60, the library address includes all of the devices D0–D3, I/O station 27, parts 40 and 41 of carrier 25, and all of the cell or slot storage addresses. ST 61 is also contemporaneously updated by LM 35 each time a record medium is either inserted into or removed from a slot. VOLSERs A and B fields of the respective slot ST 61 entry provides a continuing indication of which record medium is currently stored in the respective slots. Based on all of the above, it can be readily seen that the precise tracking including the retentive recording contemporaneous with the library movement of record media eliminates a need or desire for storing the record media in preassigned or constant slots. The logical demount procedure and the dual storage capacity of carrier 25 allows all of the storage slots in the library to be continually filled with each of the drives D0–D3 continuously holding either a mounted or unmounted record medium. Therefore, a maximal number of record media can be stored in each of the libraries.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of operating a media library having a large plurality of storage slots, each capable of storing a record medium, a plurality of media drives in the library capable of receiving and yielding a record medium for performing signal transfer operations on the medium while in the drive, carrier means moveable amongst all of said slots and drives for carrying record media therebetween, the carrier being capable of holding and carrying a plurality of said media;

the machine-executed steps of:

assigning a unique VOLSER to each of said record media;

creating a retentively stored volume table identifying all record media in the library by the respective VOLSERs and indicating that the volume table the location in the library of each record medium by its respective VOLSER;

creating a volatile library control block for the library indicating which of said record media are in the carrier and slots by the respective VOLSERs;

positioning the carrier at one of said slots or said drives, at said one slot or drive, first fetching a record medium whenever such slot or drive currently is holding a one of said record media and then inserting another record medium from the carrier into said one slot or drive;

contemporaneously to said fetching, inserting and carrying maintaining a working and a retentive copy of information identifying the record media being carried by the carrier, stored in the slots and being held by the respective drives; and when finished with a first record medium held in a given drive, leaving such record medium in the drive until a second record medium is to be mounted into the given drive and then in one carrier motion remove the first record medium from the drive and then inserting the second record medium into the given drive and then storing the first record medium in an empty one of said slots which is a closest one of the slots to the given drive irrespective of the slot from which the first record medium from for mounting into the given drive.

2. In a machine-effected method of operating a media library having a large plurality of storage slots, each capable of storing a record medium, a plurality of media drives in the library capable of receiving and yielding a record medium for performing signal transfer operations on the medium while in the drive, carrier means moveable amongst all of said slots and drives for carrying record media therebetween, the carrier being capable of holding and carrying a plurality of said media;

the machine-executed steps of:

logically demounting a medium from any of said drives while maintaining the medium in the drive; and removing the logically demounted medium from the drive only when another medium is to be mounted for data processing in the drive;

prior to removing the logically demounted medium from the drive, determining if there is a medium in any of said slots for which mounting has been commanded;

if there is no medium in any of said slots for which mounting has been commanded, after removing the logically demounted medium from the drive, storing the logically demounted medium in an empty one of said slots which is a closest one of the slots to the drive; and if there is a medium in any of said slots for which mounting has been commanded, after removing the logically demounted medium from the drive, removing the medium for which mounting has been commanded from its respective slot and storing the logically demounted medium in said respective slot.

* * * * *